Dec. 16, 1930.  C. CATTRAN  1,785,673
PRINTING ROLLER
Filed April 30, 1928

Inventor
Charles Cattran

Attorney

Patented Dec. 16, 1930

1,785,673

UNITED STATES PATENT OFFICE

CHARLES CATTRAN, OF AKRON, OHIO, ASSIGNOR TO THE GOODYEAR TIRE & RUBBER COMPANY, OF AKRON, OHIO, A CORPORATION OF OHIO

PRINTING ROLLER

Application filed April 30, 1928. Serial No. 273,817.

My invention relates to printing machinery, and it has particular relation to rolls for distributing ink in printing presses.

An object of the invention is to provide an improved resilient roll having its end portions more flexible than the intermediate portions thereof.

Heretofore, the rubber rolls employed for distributing ink in printing presses either have had plane end surfaces or conical end surfaces progressivley projecting outwardly from the ends thereof. In operating rolls of either of the aforesaid types, ink not only spread over the printing mechanism engaging surface thereof, but beyond the ends thereof upon the end faces of the roll. Some of the ink was absorbed by the rubber composing the roll, and swelling resulted because of the presence of oil and other rubber solvents in the ink. This swelling of the roll was doubly pronounced adjacent the ends thereof, because both the peripheral surface of the roll adjacent the ends, and the end faces, absorbed some of the ink. Consequently, the ends of the roll became enlarged with respect to the intermediate portions thereof. Thus, during the periods of operation of the roll, it was necessary continuously to compress the peripheral end surfaces of the roll into alignment with the intermediate portions thereof. The continuous compression of the end portions of the roll generated considerable heat in the roll, and caused excessive wear on the bearings in which the shaft supporting the roll was journalled.

This invention obviates the disadvantages heretofore referred to by providing a roll having relatively flexible ends, that may easily be pressed back into alignment with the peripheral surface of the roll intermediate thereto.

For a better understanding of the invention, reference may now be had to the accompanying drawings, forming a part of the specification, of which:

Figure 1:
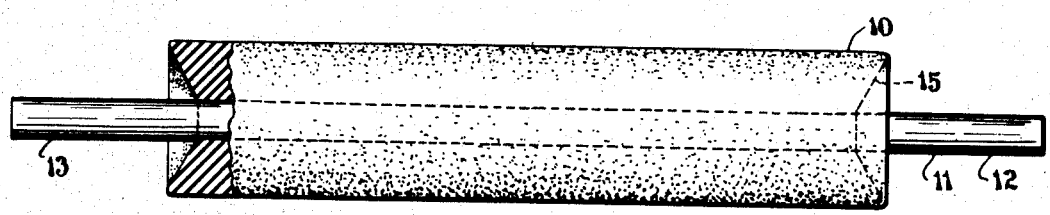
Figure 1 is an elevational view of a printing roll constructed according to one form of the invention.

Referring to Figure 1, a printing roll 10, formed of rubber, rubber composition, or other suitable resilient material, is supported upon a shaft 11. The ends 12 and 13 of the shaft 11, projecting beyond the ends of the roll 10, are adapted to be mounted in suitable bearings (not shown). Each of the end faces of the roll 10 is inwardly beveled, as indicated at 15, so that the length of the roll adjacent the shaft is less than the length of the outer peripheral surface thereof. By constructing the roll in this manner, the ends thereof are more flexible and may be forced radially inwardly with little effort. Thus, if the ends of the roll become distorted by swelling action caused by the absorption of ink, only a slight force is necessary to press the ends of the roll into alignment with intermediate portions of the peripheral surface thereof.

Figure 2:
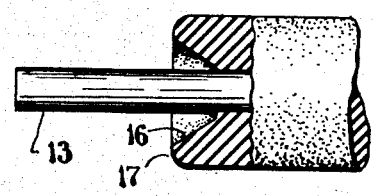
Figures 2, 3, 4 and 5 are other forms of the invention in which the end faces of the rolls have varying contours.

In the embodiment of the invention shown by Figure 2, each end face of the roll is provided with an internally projecting beveled surface 16 and a curved surface 17 joining the beveled surface with the peripheral surface of the roll.

Figure 3:
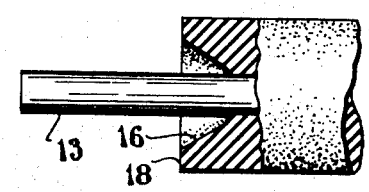

Figure 3 illustrates a form of the invention similar to that shown by Figure 2, in which a plane surface 18 joins the surface 16 and the outer surface of the roll.

Figure 4:
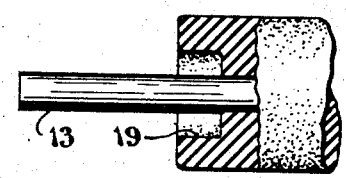

According to the construction shown by Figure 4, the ends of the roll are provided with centrally disposed cylindrical apertures 19, having radii of curvature substantially less than the radius of the outer surface of the roll.

Figure 5:
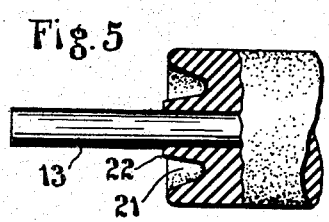

Figure 5 shows an embodiment of the invention in which an annular groove 21 is formed in each end face of the roll. In contrast to the costructions previously described, this form of the invention provides a centrally disposed protruding portion 22, the outer end of which substantially is disposed within the plane of the outer end of the roll.

In all of the constructions illustrated, it will be apparent that the ends of the roll are readily flexible in a radial direction. Thus, even though the ends of the roll become distorted by swelling, only a slight amount of energy is dissipated in moving them into alignment with the intermediate surface thereof. Consequently, the lesser amount of heat generated in the roll will be negligible, and the wear on the bearings supporting the shaft 11, likewise, will be comparatively small.

Although I have illustrated only the preferred forms which the invention may assume and have described those forms in detail, it will be apparent to those skilled in the art that the invention is not so limited, but that various minor modifications may be made therein without departing from the spirit of the invention or from the scope of the appended claims.

What I claim is:

1. A printing roll formed of resilient material, having end portions more flexible than the intermediate portions of the roll.

2. A printing roll formed of resilient material, the end faces of the roll being formed with depressions to provide greater flexibility in the end portions of the roll.

3. A printing roll formed of resilient material, the length of the peripheral surface of the roll parallel to its axis being greater than the length of other portions of the roll parallel to the latter.

4. A printing roll formed of resilient material, each end face of the roll having a beveled depression therein.

5. A printing roll composed of rubber compound, having end portions more flexible than the intermediate portions of the roll.

6. A printing roll composed of rubber compound, the end faces of the roll being formed with depressions to provide greater flexibility in the end portions of the roll.

In witness whereof, I have hereunto signed my name.

Signed at Akron, in the county of Summit, and State of Ohio, this 27th day of April, 1928.

CHARLES CATTRAN.